United States Patent
Luo et al.

(10) Patent No.: US 10,635,720 B1
(45) Date of Patent: Apr. 28, 2020

(54) DEVICE, SYSTEM AND METHOD FOR GENERATING GEOFENCES BASED ON PUBLIC-SAFETY FACTORS

(71) Applicant: MOTOROLA SOLUTIONS, INC., Chicago, IL (US)

(72) Inventors: Yang Luo, Chicago, IL (US); Isabel Firpo, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/285,824

(22) Filed: Feb. 26, 2019

(51) Int. Cl.
| H04W 4/18 | (2009.01) |
| G06F 16/909 | (2019.01) |
| G06Q 50/26 | (2012.01) |
| H04W 4/021 | (2018.01) |

(52) U.S. Cl.
CPC .......... *G06F 16/909* (2019.01); *G06Q 50/26* (2013.01); *H04W 4/022* (2013.01); *H04W 4/185* (2013.01)

(58) Field of Classification Search
CPC ...... G06Q 50/26; H04W 4/022; H04W 4/185; H04W 4/021; G06F 16/909
See application file for complete search history.

(56) References Cited

U.S. PATENT DOCUMENTS

| 2011/0134240 A1 | 6/2011 | Anderson et al. |
| 2014/0242947 A1 | 8/2014 | Ali et al. |
| 2015/0148061 A1 | 5/2015 | Koukoumidis et al. |
| 2017/0311131 A1* | 10/2017 | South ................. H04W 4/04 |

* cited by examiner

*Primary Examiner* — Said M Elnoubi
(74) *Attorney, Agent, or Firm* — Perry + Currier, Inc.

(57) ABSTRACT

A device, system and method for generating geofences based on public-safety factors is provided. Responsive to receiving, via an input device, an input requesting formation of a public-safety geofence at a given location of a map rendered at the display screen, the device: retrieves public-safety factors from at least one public-safety information database; renders, at a display screen, at the given location of the map, a first public-safety geofence shaped and sized according to the factors; renders, at the display screen, respective indications of the factors. Responsive to receiving, via the input device, disabling input to disable a given factor represented by the respective indications of the factors, the device: disables the given factor; and replaces, at the display screen, at the given location of the map, the first geofence with a second public-safety geofence shaped and sized according to enabled factors which exclude the given factor as disabled.

18 Claims, 6 Drawing Sheets

US 10,635,720 B1

DEVICE, SYSTEM AND METHOD FOR GENERATING GEOFENCES BASED ON PUBLIC-SAFETY FACTORS

BACKGROUND OF THE INVENTION

Public-safety personnel, such as dispatchers, often draw geofences relying on visual, visible map elements and manual drawing of the geofence. However, there are many cases where geofences having boundaries that are complex would be appropriate.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
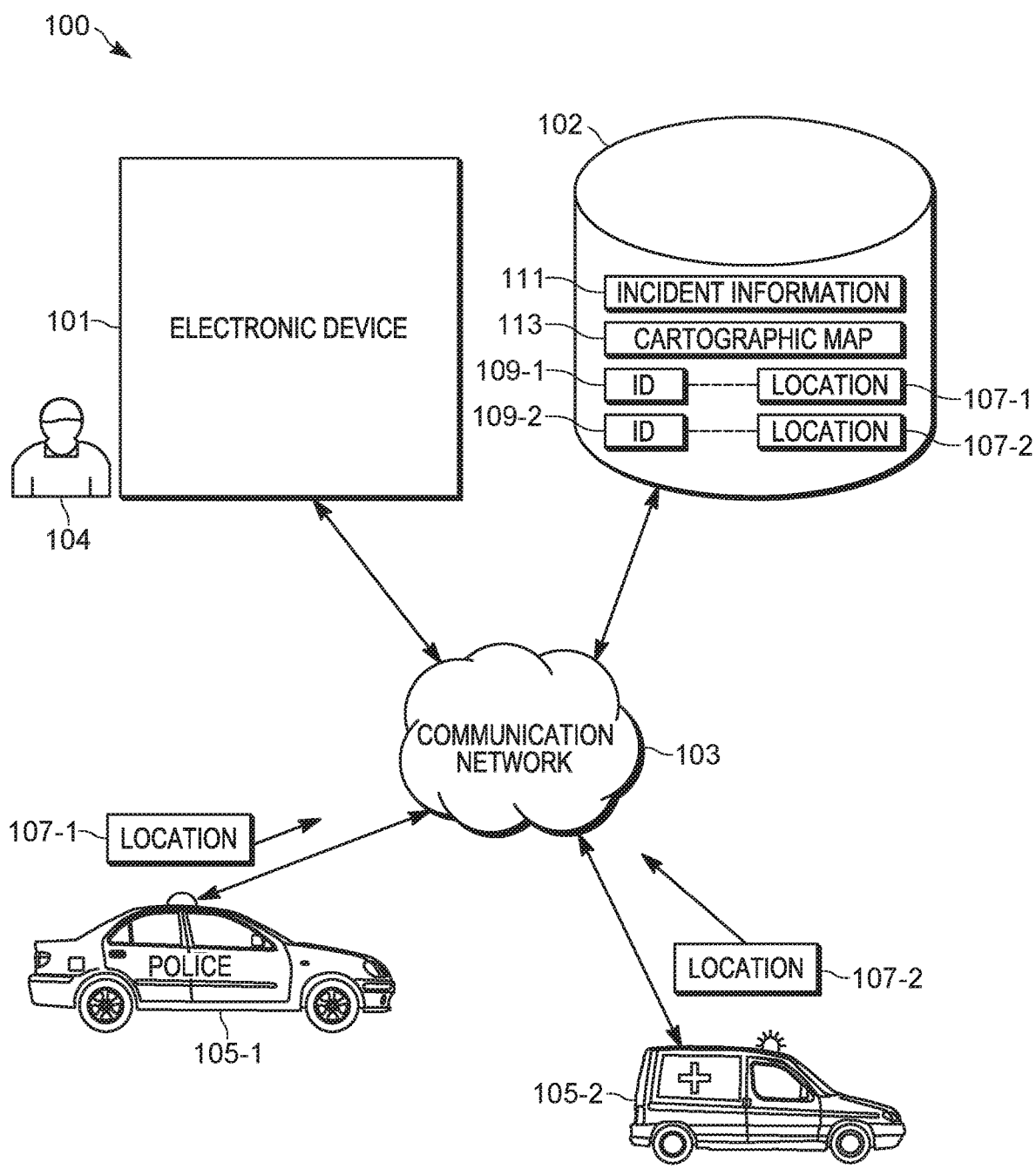
FIG. 1 is a system for generating geofences based on public-safety factors, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Public-safety personnel, such as dispatchers, often draw geofences relying on visual, visible map elements and manual drawing of the geofence. However, there are many cases where geofences having boundaries that are complex would be appropriate. While such geofences could be manually drawn, drawing such geofences is both time-consuming and requires significant use of input devices; when the geofences are used to dispatch public-safety responders to a public-safety incident, delays in manually drawing complex geofences may lead to delays in dispatching public-safety responders to the public-safety incident, which could lead to the incident becoming worse.

The present specification provides a method comprising: responsive to receiving, at an input device, an input requesting formation of a public-safety geofence at a given location of a cartographic map rendered at a display screen: retrieving, via an electronic device, public-safety factors from at least one public-safety information database; rendering, at the display screen, at the given location of the cartographic map, a first public-safety geofence shaped and sized according to the public-safety factors; rendering, at the display screen, respective indications of the public-safety factors; responsive to receiving, at the input device, disabling input to disable a given public-safety factor represented by the respective indications of the public-safety factors: disabling the given public-safety factor; and replacing, at the display screen, at the given location of the cartographic map, the first public-safety geofence with a second public-safety geofence shaped and sized according to enabled public-safety factors which exclude the given public-safety factor as disabled.

The present specification further provides a device comprising: a controller in communication with an input device and a display screen, the controller configured to: responsive to receiving, via the input device, an input requesting formation of a public-safety geofence at a given location of a cartographic map rendered at the display screen: retrieve public-safety factors from at least one public-safety information database; render, at the display screen, at the given location of the cartographic map, a first public-safety geofence shaped and sized according to the public-safety factors; render, at the display screen, respective indications of the public-safety factors; responsive to receiving, via the input device, disabling input to disable a given public-safety factor represented by the respective indications of the public-safety factors: disable the given public-safety factor; and replace, at the display screen, at the given location of the cartographic map, the first public-safety geofence with a second public-safety geofence shaped and sized according to enabled public-safety factors which exclude the given public-safety factor as disabled.

Attention is directed to FIG. 1, which depicts an example system 100 for generating geofences based on public-safety factors, in accordance with some examples. The system 100 comprises an electronic device 101 for generating geofences based on public-safety factors. As depicted, the electronic device 101 (interchangeably referred to hereafter as the device 101) is in communication with at least one public-safety information database 102 (interchangeably referred to hereafter as the database 102) via a communication network 103 (interchangeably referred to hereafter as the network 103), such as the Internet, a cell network and/or a public-safety communication network, and the like. For example, each of the device 101 and the database 102 may be in communication with the network 103 via respective wired or wireless communication links, as desired, depicted in FIG. 1 as double-ended arrows between the network 103 and respective components of the system 100. However, the device 101 and the database 102 may be co-located and in communication via a local network and/or the device 101 may comprise the database 102 (e.g. the database 102 may be a memory of the device 101). Indeed, a person of skill in the art understands that the database 102 is generally a component of an electronic device and/or a computing device and/or communication device that provides communications at the database 102 with the network 103 and/or the device 101. Furthermore, while only one database 102 is depicted, the database 102 may comprise more than one database, and/or information depicted as stored at the database 102 may be stored in a plurality of databases, for example in a cloud-computing environment; indeed, the device 101 and the at least one database 102 may be components of a cloud-computing environment.

Each of the device 101 and the database 102 may be associated with, and/or maintained by, a public-safety entity, such as a police department, a fire department, an emergency medical services department, and the like. As depicted, a user 104 may be locally operating the device 101, for example via an input device and a display screen of the device 101; however, the user 104 may be remote from the device 101 and operating the device 101 via a remote terminal in communication with the device 101, the remote terminal including an input device and a display screen. The user 104 may be associated with, and/or an employee of, the entity associated with the device 101 and/or the database 102. For example, the user 104 may be a dispatcher, and the like, interacting with the device 101 to dispatch responding units (described in more details below) to a public-safety incident, and the like, and the device 101 may generate geofences to assist the user 104 with dispatching responding units to an incident.

As depicted, the system 100 further comprises a plurality of responding units 105-1, 105-2, etc., interchangeably referred to hereafter, collectively, as the responding units 105 and, generically, as a responding unit 105. The responding units 105 are each in communication with the database 102 and/or the device 101 via the network 103 and may be available to be dispatched to the public-safety incident and/or may be available to wirelessly receive information associated with the public-safety incident. For example, as depicted, the responding unit 105-1 comprises a police vehicle and the responding unit 105-2 comprises an ambulance; however, in other examples, each of the responding units 105 may comprise any suitable type of public-safety vehicle including, but not limited to, police vehicles, fire trucks, ambulances, and the like, and/or any other type of vehicle which may be dispatched to respond to a public-safety incident, and/or which may wirelessly receive information associated with the public-safety incident, and the like. Furthermore, while only two responding units 105 are depicted, the system 100 may comprise any suitable number of responding units 105.

Each of the responding units 105 may generally transmit, via the network 103, their respective locations 107-1, 107-2 (interchangeably referred to hereafter, collectively, as the locations 107 and, generically, as a location 107) to the database 102, for example periodically and/or on demand and/or on an on-going basis. Hence, the database 102 generally stores the location 107 of each of the responding units 105 in association with one or more respective identifiers 109-1, 109-2 of a responding unit 105 (the identifiers 109-1, 109-2 interchangeably referred to hereafter, collectively, as the identifiers 109 and, generically, as an identifier 109). For example, the identifier 109-1, as depicted, identifies the responding unit 105-1 and the identifier 109-2 identifies the responding unit 105-2. The locations 107 may comprise any suitable type of location identifier, such as Global Positioning System (GPS) identifiers, geographic addresses, and the like. Each of the identifiers 109 may comprise one or more of a unit number and/or unit identifier (e.g. a serial number, a badge number, an employee number, a vehicle number, a Media Access Control (MAC) address and/or an Internet Protocol (IP) address of a computing device at a responding unit the like), a unit type and/or role (e.g. police, fire, ambulance, and the like, and/or a rank and/or assigned role), and/or any other suitable identifier type. While not depicted, the locations 107 may be transmitted with a respective identifier 109 for storage at the database 102. Associations between data stored at the database 102 are generally indicated via dashed lines therebetween.

As depicted, the database 102 further stores incident information 111 comprising information associated with a public-safety incident to which the responding units 105 may be dispatched, and the like. The incident information 111 may include, but is not limited to, an incident type, a priority, a time of the incident, an address of the incident, a suspect in the incident, incident objects of interest relative to the incident, responding units 105 already dispatched to the incident and the like. Indeed, the incident information 111 may comprise a computer-aided-dispatch record associated with the user 104 and/or the public-safety incident and/or operators (e.g. public-safety personnel) of the responding units 105, and the like. Such computer-aided-dispatch records may be generated by a computer-aided-dispatch device of the system 100 and/or the device 101 (e.g. the device 101 may comprise a computer-aided-dispatch device of a public-safety entity).

As depicted, the database 102 further stores a cartographic map 113 (interchangeably referred to hereafter as the map 113). The map 113 generally includes a geographic area managed by the public-safety entity of the user 104 and the responding units 105. Hence, the map 113 may include a location of a public-safety incident. Alternatively, the map 113 may include the location of a public-safety incident and/or "beat" information (e.g. of the responder units 105 and/or other responder units and/or responders) and/or public-safety entity jurisdiction information (e.g. geographic boundaries of a police department jurisdiction), and the like.

Figure 2:
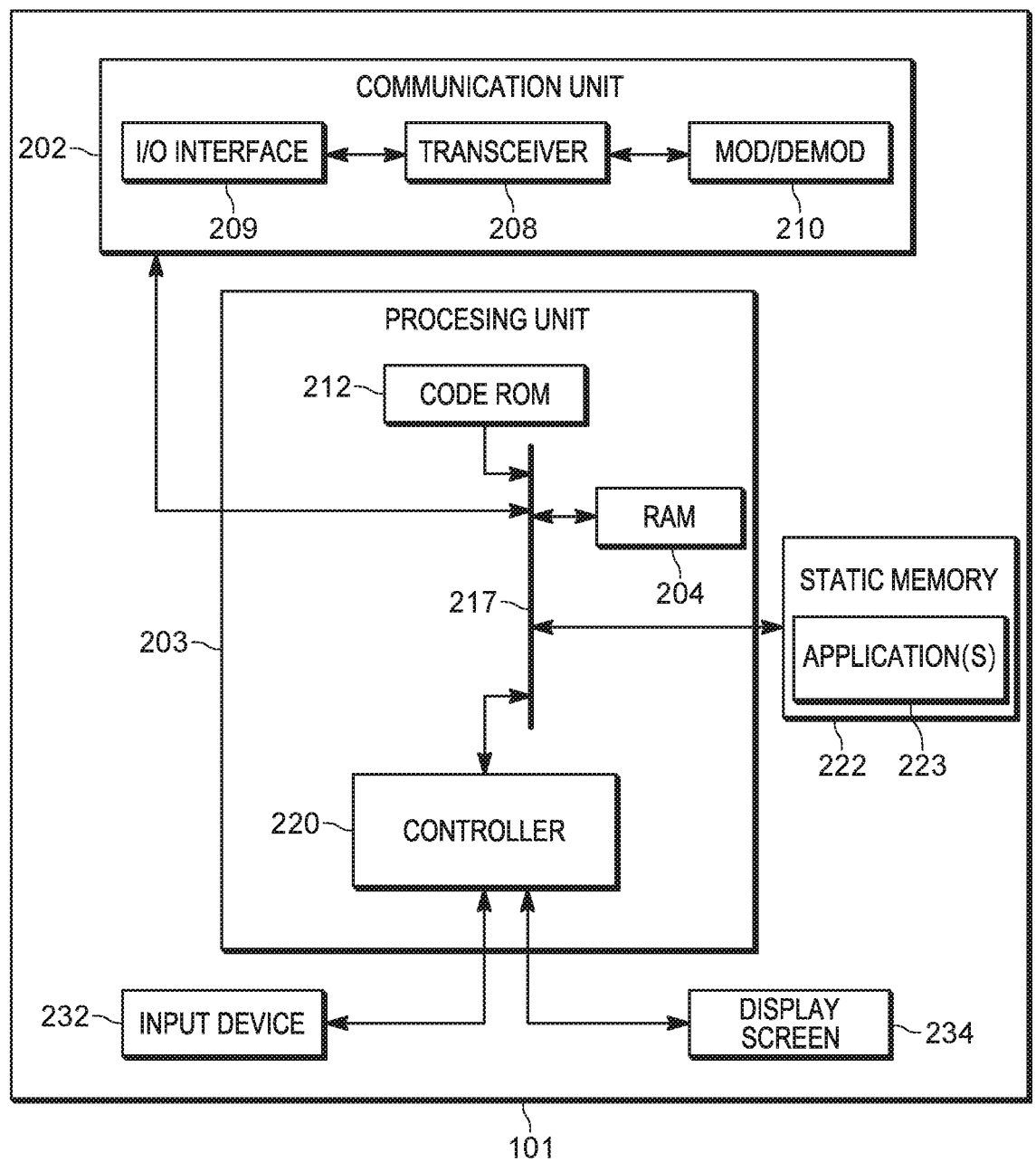
FIG. 2 is a device diagram showing a device structure of an electronic device for generating geofences based on public-safety factors, in accordance with some examples.

Attention is next directed to FIG. 2, which depicts a schematic block diagram of an example of the device 101.

In general, the device 101 may comprise a server and/or cloud-based computing device comprising: a communications unit 202, a processing unit 203, a Random-Access Memory (RAM) 204, one or more wireless transceivers 208, one or more wired and/or wireless input/output (I/O) interfaces 209, a combined modulator/demodulator 210, a code Read Only Memory (ROM) 212, a common data and address bus 217, a controller 220, a static memory 222 storing at least one application 223, an input device 232 and a display screen 234. Hereafter, the at least one application 223 will be interchangeably referred to as the application 223.

Furthermore, each of the memories 212, 222 comprise non-transitory memories and/or non-transitory computer readable mediums. In some examples, memory 222 comprises the database 102.

As shown in FIG. 2, the device 101 includes the communications unit 202 coupled to the common data and address bus 217 of the processing unit 203.

The input device 232 may comprise one or more of a keypad, pointing device, touch-sensitive surface (e.g. at the display screen 234), and the like, and the display screen 234 may comprise a flat panel display, and the like, which, in some examples, may include a touch screen and/or a touch-sensitive surface of the input device 232. Hence, the display screen 234 may also act as an input device. Each of the input device 232 and the display screen 234 is in communication with the processing unit 203 and/or the controller 220. While not depicted, the device 101 may also include one or more of a speaker and a microphone used for interactions with the device 101.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222.

The communications unit 202 may include one or more wired and/or wireless input/output (I/O) interfaces 209 that are configurable to communicate with corresponding communication units at the responding units 105, and/or the database 102 and/or the network 103. For example, the communication unit 202 may include one or more transceivers 208 and/or wireless transceivers for communicating with the database 102, the network 103, and/or the responding units 105. Hence, the one or more transceivers 208 may be adapted for communication with the network 103. For example, the network 103 may comprise one or more of a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) networks, a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a Bluetooth transceiver, a Wi-Fi transceiver, a WiMAX transceiver, and/or another similar type of wireless transceiver configurable to communicate via a wireless radio network.

The communications unit 202 may optionally include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g. hardware ports) for coupling to other hardware components (e.g. the input device 232, the display screen 234, and the like). Indeed, the input device 232 and/or the display screen 234 may be located external to the device 101 and in communication with the device 101 via such ports. Alternatively, the input device 232 and/or the display screen 234 may be located remote from the device 101 (e.g. at a terminal operated by the user 104) and in communication with the device 101 via the communication unit 202 and/or the network 103.

The controller 220 includes one or more logic circuits, one or more processors, one or more microprocessors, one or more ASIC (application-specific integrated circuits) and one or more FPGA (field-programmable gate arrays), and/or another electronic device. In some examples, the controller 220 and/or the device 101 is not a generic controller and/or a generic device, but a device specifically configured to implement functionality for generating geofences based on public-safety factors. For example, in some examples, the device 101 and/or the controller 220 specifically comprises a computer executable engine configured to implement functionality for generating geofences based on public-safety factors.

The static memory 222 is a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the device 101 as described herein are maintained, persistently, at the memory 222 and used by the controller 220, which makes appropriate utilization of volatile storage during the execution of such programming instructions.

Figure 3:
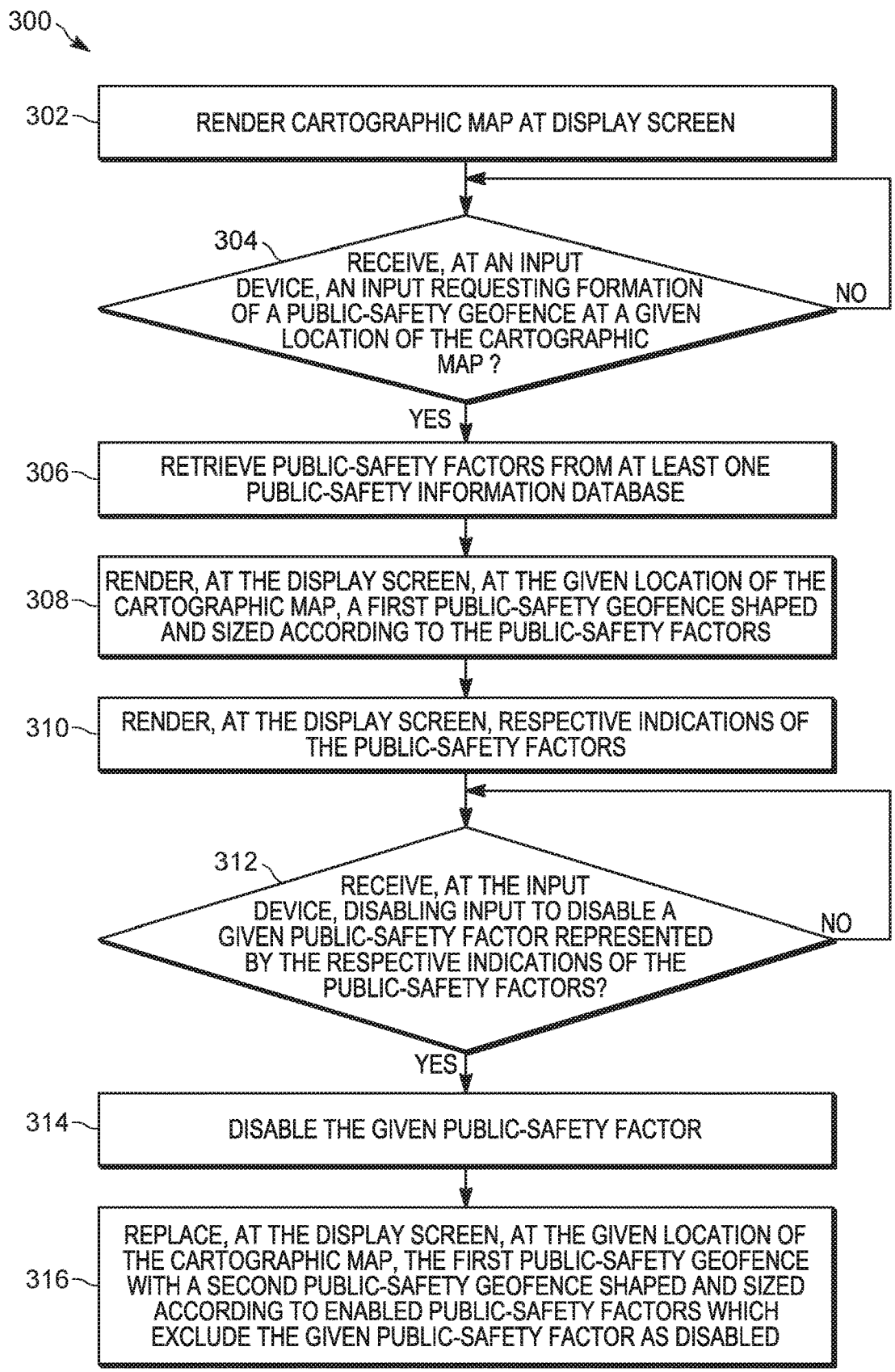
FIG. 3 is a flowchart of a method for generating geofences based on public-safety factors, in accordance with some examples.

In particular, the memory 222 stores instructions corresponding to the at least one application 223 that, when executed by the controller 220, enables the controller 220 to implement functionality for generating geofences based on public-safety factors including, but not limited to, the blocks of the method set forth in FIG. 3. In illustrated examples, when the controller 220 executes the one or more applications 223, the controller 220 is enabled to: responsive to receiving, at the input device 232, an input requesting formation of a public-safety geofence at a given location of a cartographic map rendered at the display screen 234: retrieving, via the electronic device 101, public-safety factors from the at least one public-safety information database 102; rendering, at the display screen 234, at the given location of the cartographic map 113, a first public-safety geofence shaped and sized according to the public-safety factors; rendering, at the display screen 234, respective indications of the public-safety factors; responsive to receiving, at the input device 232, disabling input to disable a given public-safety factor represented by the respective indications of the public-safety factors: disabling the given public-safety factor; and replacing, at the display screen 234, at the given location of the cartographic map 113, the first public-safety geofence with a second public-safety geofence shaped and sized according to enabled public-safety factors which exclude the given public-safety factor as disabled.

Indeed, the application 223 may include machine learning and/or deep-learning based algorithms, and the like, which have been trained and/or configured to shape and/or size geofences based on public-safety factors. Furthermore, the application 223 may initially be operated by the controller 220 in a training mode to train the application 223 shape and/or size geofences based on public-safety factors, as described in more detail below.

The one or more machine learning algorithms and/or deep learning algorithms of the application 223 may include, but are not limited to: a generalized linear regression algorithm; a random forest algorithm; a support vector machine algorithm; a gradient boosting regression algorithm; a decision tree algorithm; a generalized additive model; neural network algorithms; deep learning algorithms; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public-safety environments. However, any suitable machine learning algorithm and/or deep learning algorithm is within the scope of present examples.

While details of the responding units 105 are not depicted, each of the responding units 105 may have components similar to the device 101 adapted, however, for the functionality of the responding units 105; for example, each responding unit 105 may have a communication unit, controller and the like adapted to communicate with the device 101 and/or the database 102 and/or the network 103. However, a responding unit 105 may not include a display screen and/or a responding unit 105 may not include an input device (other than to operate the responding unit 105), and/or an application stored at a memory of a responding unit 105 is generally adapted to provide the functionality of the responding unit 105 when implemented by a respective controller.

Attention is now directed to FIG. 3, which depicts a flowchart representative of a method 300 for generating geofences based on public-safety factors. The operations of the method 300 of FIG. 3 correspond to machine readable instructions that are executed by the device 101, and specifically the controller 220 of the device 101. In the illustrated example, the instructions represented by the blocks of FIG. 3 are stored at the memory 222 for example, as the application 223. The method 300 of FIG. 3 is one way in which the controller 220 and/or the device 101 and/or the system 100 may be configured. Furthermore, the following discussion of the method 300 of FIG. 3 will lead to a further understanding of the system 100, and its various components. However, it is to be understood that the method 300 and/or the system 100 may be varied, and need not work exactly as discussed herein in conjunction with each other, and that such variations are within the scope of present examples.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 220 renders the cartographic map 113 at the display screen 234. For example, the user 104 may operate the device 101 to cause the controller 220 and/or the device 101 to render the map 113 in association with dispatching one or more of the responding units 105 to a public-safety incident at a given location (e.g. the location of the public-safety incident, as stored in the incident information 111), the public-safety incident having been assigned to the user 104 to manage. Indeed, one or more of the responding units 105 may already have been assigned to the public-safety incident. Furthermore, the map 113 as rendered at the display screen 234 may generally include the location of the public-safety incident.

At a block 304, the controller 220 may determine whether an input has been received at the input device 232, the input for requesting formation of a public-safety geofence at a given location of the cartographic map 113 rendered at the display screen 234. For example, the user 104 may operate the input device 232 to cause input to be received to request formation of a public-safety geofence. Public-safety geofences may be used to determine which responding units 105 are within the public-safety geofence such that responding units 105 within the public-safety geofence may be dispatched to the public-safety incident and/or such that information associated with the public-safety incident may be transmitted to responding units 105 are within the public-safety geofence. In some examples, depending on a type and/or priority of a public-safety incident, public-safety geofence may be used to set exclusion zones and/or traffic (and/or pedestrian) control zones around the public-safety incident.

In particular, the input requesting formation of the public-safety geofence may not indicate both a shape and a size of the public-safety geofence. Alternatively, the input requesting formation of the public-safety geofence may not indicate one of a shape and a size of the public-safety geofence. Hence, the input generally causes the controller 220 and/or the device 101 to automatically determine at least one of a shape and a size of the public-safety geofence based on public-safety factors as described hereafter. For example, the input may indicate one (but not both) of a minimum size of a public-safety geofence and/or a shape (e.g. circular and/or bounded by streets) of the public-safety geofence.

When no input is received at the block 304 (e.g. a "NO" decision at the block 304), the controller 220 and/or the device 101 may perform other tasks (e.g. related to dispatching responding units 105 to a public-safety incident) and/or, as depicted, the block 304 may be repeated until the input is received.

At a block 306, responsive to receiving, at the input device 232, an input requesting formation of a public-safety geofence at a given location of a cartographic map rendered at the display screen 234 (e.g. a "YES" decision at the block 304), the controller 220, retrieves, public-safety factors from the at least one public-safety information database 102. The public-safety factors may include, but are not limited to, a responding unit location 107 (e.g. of a responding unit 105 assigned to the incident), a responding unit role and/or type, an incident type, and/or any other information stored at the database 102 associated with the public-safety incident assigned to the user 104 to manage, as described above.

At a block 308, the controller 220 renders, at the display screen 234, at the given location of the cartographic map 113, a first public-safety geofence shaped and sized according to the public-safety factors. For example, the at least one machine learning algorithm, and the like, of the application 223, may cause the first public-safety geofence to be rendered at the display screen 234 based on the public-safety factors. At the block 308, the first public-safety geofence may be based on all the public-safety factors retrieved at the block 306 and/or a preconfigured subset of the public-safety factors retrieved at the block 306.

At a block 310, the controller 220 renders, at the display screen 234, respective indications of the public-safety factors. For example, the public-safety factors may be rendered as text, graphic, and the like, for example, in a taskbar, and the like, adjacent the map 113 at the display screen 234.

At a block 312, the controller 220 determines whether disabling input has been received at the input device 232. Such disabling input is to disable a given public-safety factor represented by the respective indications of the public-safety factors.

Indeed, in some examples, at the block 310, the controller 220 may render, at the display screen 234, with the respective indications of the public-safety factors, respective selectable modification functions. Hence, disabling input may include, but is not limited to, selectable modification functions being selected to disable an associated public-safety factor. For example, the disabling input may be received in association with a given selectable modification function being actuated to disable a given public-safety factor. For example, selectable modification functions may include, but are not limited to, virtual switches and/or fields for enabling, disabling and/or modifying the public-safety factors for use in generating public-safety geofences. In some examples, in addition to disabling a public-safety factor, the respective selectable modification functions may further used to one or more of enable and modify an associated public-safety factor via receipt of respective enabling input and respective modifying at the input device.

When no disabling input is received at the block 312 (e.g. a "NO" decision at the block 304), the controller 220 and/or the device 101 may perform other tasks (e.g. related to dispatching responding units 105 to a public-safety incident) and/or, as depicted, the block 312 may be repeated until the disabling input is received.

When disabling input is received at the block 312 to disable a given public-safety factor (e.g. a "YES" decision at the block 304), at a block 314, the controller 220, responsive to receiving, at the input device 232, the disabling input, disables the given public-safety factor.

Furthermore, at a block 316, the controller 220 replaces, at the display screen 234, at the given location of the cartographic map 113, the first public-safety geofence with a second public-safety geofence shaped and sized according to enabled public-safety factors which exclude the given public-safety factor as disabled.

Hence, the second public-safety geofence may differ from the first public-safety geofence as the second public-safety geofence is shaped and sized based on fewer public-safety factors than the first public-safety geofence as one or more of the public-safety factors used to generate the first public-safety geofence is disabled when generating the second public-safety geofence.

For some examples, the public-safety factors used to generate the first public-safety geofence may include a responding unit location (e.g. a location 107 of a responding unit 105 dispatched to the public-safety incident) Hence, in these examples, the respective indications of the public-safety factors, rendered at the display screen 234 at the block 310, include a respective indication of the responding unit location 107. The responding unit location 107 may be disabled by the disabling input at the block 310, and the second public-safety geofence may be shaped and sized according to the enabled public-safety factors which excludes the responding unit location 107.

In other examples, the public-safety factors used to generate the first public-safety geofence may include a responding unit role (e.g. police, fire, medical, and the like). For example, a size and/or shape of the first public-safety geofence may differ based on the responding unit role (e.g. larger for fire and medical, but smaller for police). Hence, in these examples, the respective indications of the public-safety factors, rendered at the display screen 234 at the block 310, include a respective indication of the responding unit role. The responding unit role may be disabled by the disabling input at the block 310, and the second public-safety geofence may be shaped and sized according to the enabled public-safety factors which excludes the responding unit role.

In yet other examples, the public-safety factors used to generate the first public-safety geofence may include an incident type. Hence, in these examples, the respective indications of the public-safety factors, rendered at the display screen 234 at the block 310, include a respective indication of the incident type. The responding unit role may be disabled by the disabling input at the block 310, and the second public-safety geofence may be shaped and sized according to the enabled public-safety factors which excludes the incident type.

However, other types of public-safety factors used to generate the first public-safety geofence including, but not limited to, a time of the public-safety incident. For example, a size of the first public-safety geofence may increase as difference between a current time and the time of the public-safety incident increases.

In some examples, public-safety factors used to generate the first public-safety geofence may be weighted for determining the size and/or shape of a public-safety geofence. For example, a priority of a public-safety incident may have a higher weight than a role of a responding unit 105.

In yet further examples, the method 300 may include one or more of: receiving, at the input device 232, modifying input to modify a given enabled public-safety factor of the enabled public-safety factors; and receiving, at the input device 232, enabling input to enable the given public-safety factor which was disabled at the block 314.

For example, the method 300 may further comprise: responsive to receiving, at the input device 232, modifying input to modify a given enabled public-safety factor of the enabled public-safety factors: modifying the given enabled public-safety factor; and replacing, at the display screen 234, at the given location of the cartographic map 113, the second public-safety geofence with a third public-safety geofence shaped and sized according to the enabled public-safety factors which include the given public-safety factor as modified. Hence, in these examples, an enabled public-safety factor may be changed and/or modified (e.g. an incident type and/or an incident priority and/or a responding unit role may be changed and/or modified) and a public-safety geofence may be updated and/or replaced accordingly.

Similarly, the method 300 may further comprise: responsive to receiving, at the input device 232, enabling input to enable a given public-safety factor (e.g. previously disabled at the block 314): enabling the given public-safety factor; and replacing, at the display screen 234, at the given location of the cartographic map 113, the second public-safety geofence (e.g. as rendered at the block 316) with a third public-safety geofence shaped and sized according to the enabled public-safety factors which include the given public-safety factor as enabled. Indeed, the third public-safety geofence may be similar to the first public-safety geofence rendered at the block 308.

Indeed, in some examples, the method 300 may be used to disable, enable and/or modify given public-safety factors to updated and/or generate and/or replace public-safety geofences.

Figure 4:
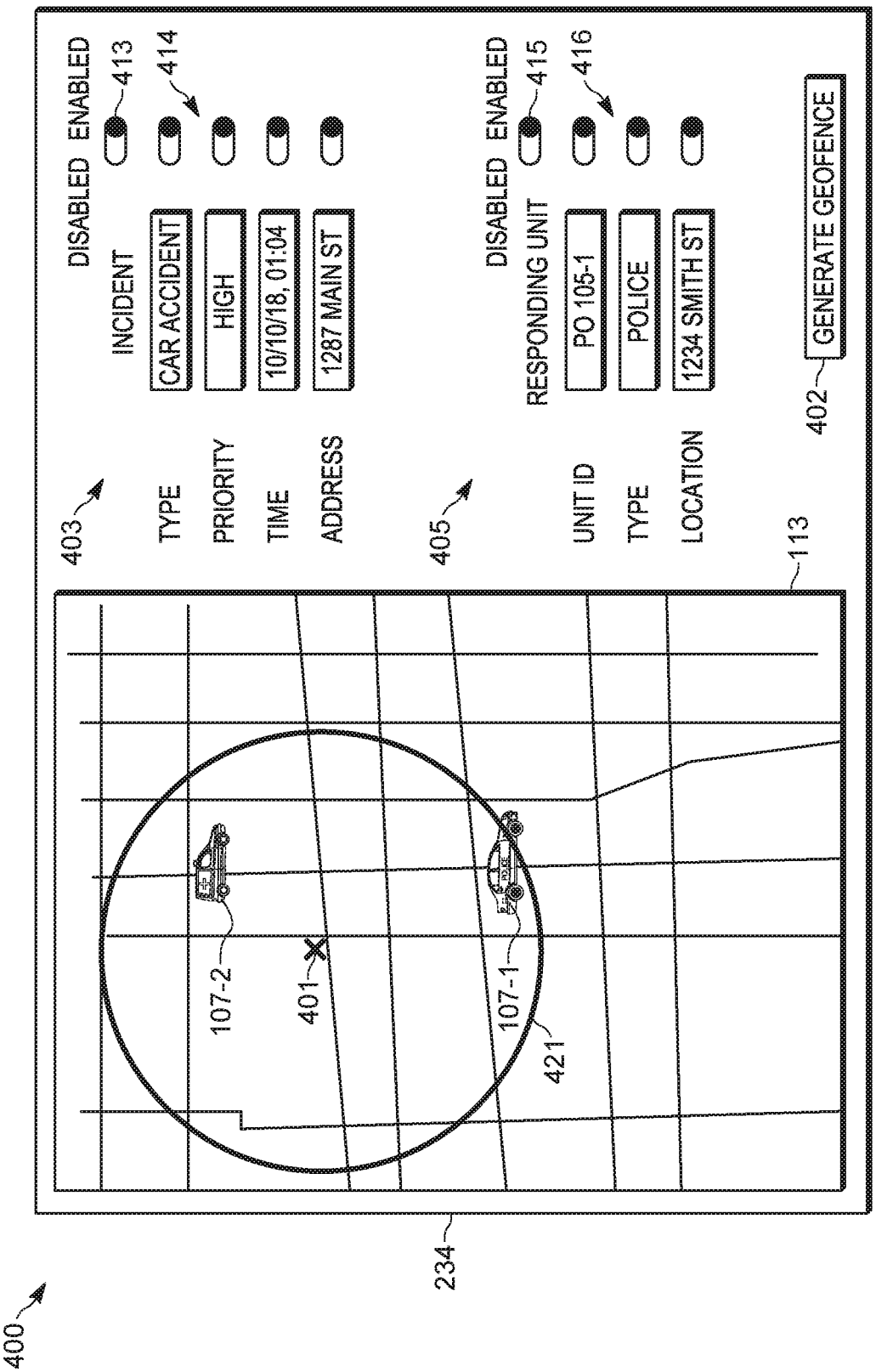
FIG. 4 depicts a graphic user interface at a display screen of the device of FIG. 2, to show an example of a method for generating geofences based on public-safety factors, in accordance with some examples.
Figure 5:
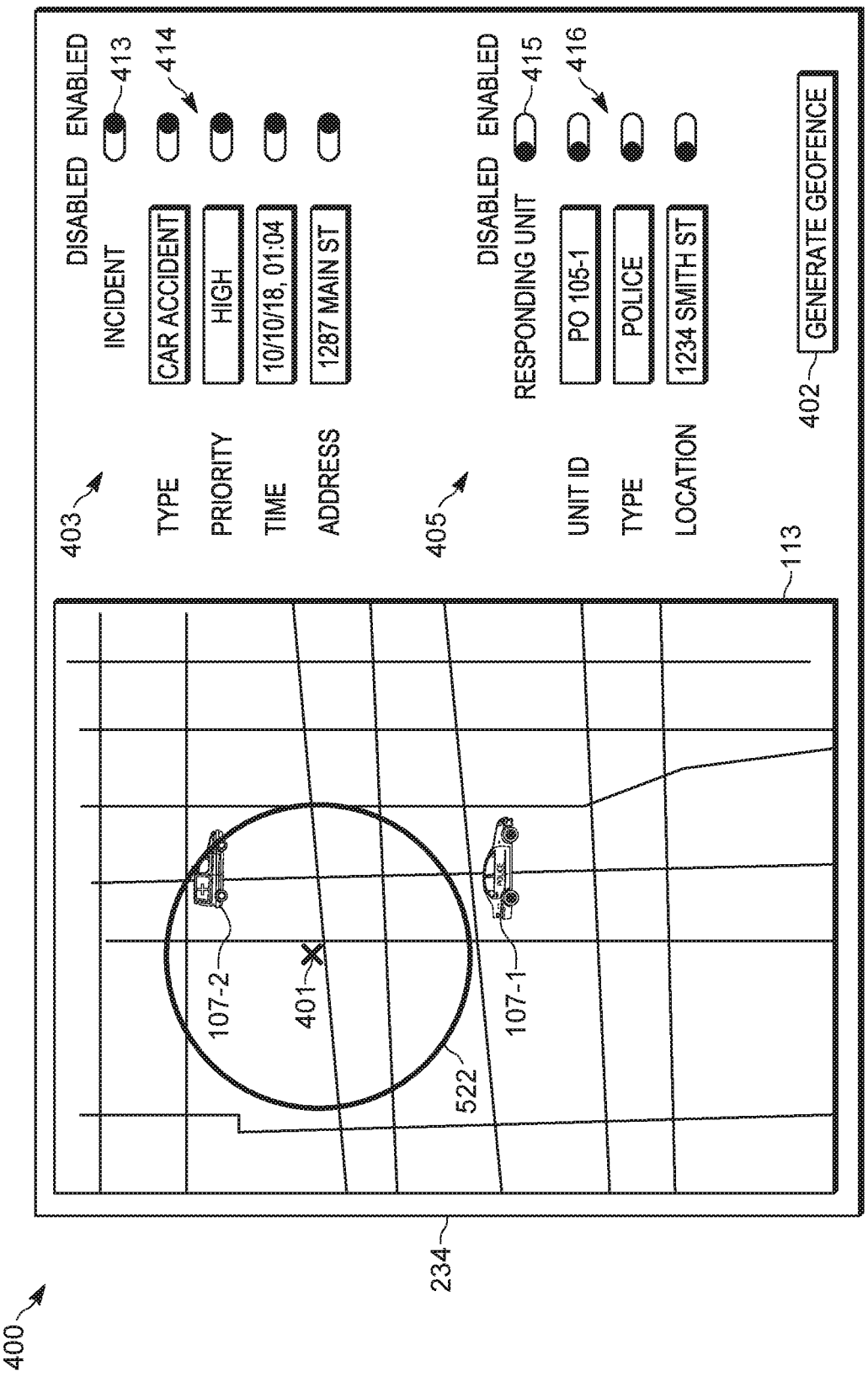
FIG. 5 depicts the graphic user interface of FIG. 4, modified to replace, at the display screen, at the given location of a cartographic map, a first public-safety geofence with a second public-safety geofence shaped and sized according to enabled public-safety factors which exclude disabled given public-safety factor, in accordance with some examples.
Figure 6:
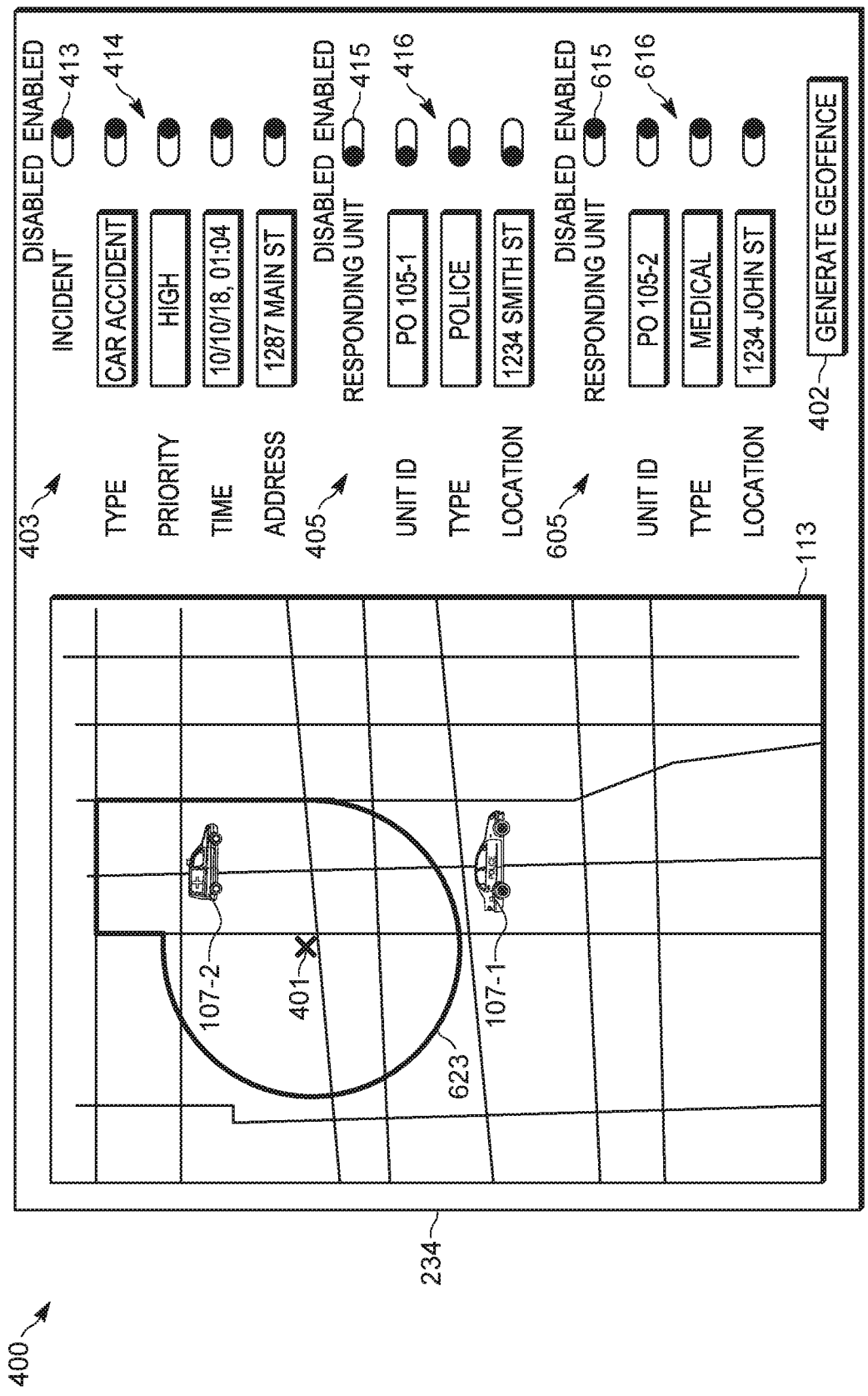
FIG. 6 depicts the graphic user interface of FIG. 5, modified to replace, at the display screen, at the given location of a cartographic map, the second public-safety geofence with a third public-safety geofence shaped and sized according to further enabled public-safety factors which exclude disabled given public-safety factor, in accordance with some examples.

Attention is next directed to FIG. 4, FIG. 5 and FIG. 6, which are substantially similar to one another, with like components having like numbers. In particular, FIG. 4, FIG. 5 and FIG. 6 depict an example of the method 300. Each of FIG. 4, FIG. 5 and FIG. 6 depicts an example graphic user interface (GUI) 400 rendered at the display screen 234. In the depicted example, the device 101 may have received an incident report of a "Car Accident" having a "High" priority, which occurred on Oct. 10, 2018 at 01:04, at 1287 Main St. The first responding unit 105-1 may have been assigned to the incident.

With attention first directed to FIG. 4, the GUI 400 comprises: the map 113 that includes a location 401 of the incident of the incident report, as rendered at the block 302 of the method 300; an actuatable input 402 for requesting formation (e.g. at the block 304 of the method 300) of a public-safety geofence at a given location of the cartographic map 113 rendered at the display screen 234; and indications 403, 405 of public-safety factors as retrieved from the database 102 at the block 306 of the method 300 and rendered at the block 310 of the method 300. Also depicted on the map 113 are the locations 107-1, 107-2 of the responding units 105-1, 105-2, along with respective icons representing the responding units 105-1, 105-2 at the locations 107-1, 107-2. Hence, in FIG. 4, at least the public-safety factors associated with the first responder unit 105-1, and a portion of the public-safety factors associated with the second responder unit 105-2, such as the location 107-2 and the type, have been retrieved from the database 102.

For example, as depicted, the indications 403 include at least a subset of the incident information 111 such as a type ("Car Accident"), priority ("High"), time ("10/10/2018, 01:04") and address ("1287 Main St") of an incident, which are used to populate fields of the indications 403.

As depicted, the indications 405 include information associated with the responding unit 105-1, such as a unit identifier ("PO 105-1"), a unit type ("Police"), and the location 107-1 ("1234 Smith St"). As depicted, the indications 403 include at least a subset of the identifiers 109-1 which are used to populate fields of the indications 405.

As also depicted in FIG. 4, each of the indications 403, 405 are associated with respective selectable modification functions 413, 414, 415, 416 for enabling and disabling associated indications 403, 405. For example, as depicted, each of the selectable modification functions 413, 414, 415, 416 comprise a respective virtual switch for disabling and enabling associated public-safety factors represented by the indications 403, 405. As depicted, each of the respective virtual switches of the selectable modification functions 413, 414, 415, 416 included an "Enabled" position and a "Disabled" position. Actuation of a respective virtual switch to an enabled position, causes associated public-safety factors represented by the indications 403, 405 to be enabled, and Actuation of a respective virtual switch to a disabled position, causes associated public-safety factors represented by the indications 403, 405 to be disabled.

In particular, the selectable modification function 413 comprises a universal incident selectable modification function which, when switched to the disabled position, causes all respective selectable modification functions 414 for the individual public-safety factors associated with the incident to be disabled. However, when the selectable modification function 413 is in the enabled position, respective selectable modification functions 414 may be modified to respective disabled and enabled positions to cause the individual public-safety factors associated with the incident to be disabled and enabled independent of one another.

Similarly, the selectable modification function 415 comprises a universal responding unit selectable modification function which, when switched to the disabled position, causes all respective selectable modification functions 416 for the individual public-safety factors associated with the responding unit 105-1 to be disabled. However, when the selectable modification function 415 is in the enabled position, respective selectable modification functions 416 may be modified to respective disabled and enabled positions to cause the individual public-safety factors associated with the responding unit 105-1 to be disabled and enabled independent of one another.

While the depicted example shows receipt of disabling input (and/or enabling input) via actuation of the selectable modification functions 413, 414, 415, 416, the disabling input (and/or the enabling input) may be received in any suitable manner, including, but not limited to, menus accessible, for example, via right mouse clicks, and the like.

To initially generate a public-safety geofence based on the enabled public-safety factors represented by the indications 403, 405, the user 104 may actuate the actuatable input 402 (e.g. at the block 304 of the method 300) which causes the device 101 to receive input requesting formation of the public-safety geofence. As depicted, actuation of the actuatable input 402 does not indicate either a shape and a size of the public-safety geofence to be generated.

However, it is understood that the actuatable input 402 may be optional, and that input requesting formation of the public-safety geofence may be received in any suitable manner. For example, the user 104 may be operating the device 101 through a menu system, and the input requesting formation of the public-safety geofence may comprise one or more of: selection of a menu item, for example to cause rendering of the map 113; and/or to selection of a menu item to cause rendering of the indications 403, 405 (and the selectable modification functions 413, 414, 415, 416), and the like.

As depicted, it is understood that the actuatable input 402 (and the like) has been actuated and/or input requesting formation of the public-safety geofence has been received (e.g. a "YES" decision has occurred at the block 304 of the method 300) and the device 101 has retrieved the public-safety factors (e.g. at the block 306 of the method 300) and rendered (e.g. at the block 308 of the method 300), at the map 113, at the display screen 234, a first public-safety geofence 421 centered on the location 401 of the incident, and which has been generated to be shaped and sized according to the public-safety factors represented by the indications 403, 405.

As depicted, the first public-safety geofence 421 has a circular shape, however, the first public-safety geofence 421 may have other shapes including, but not limited to, shapes defined by and/or bounded by streets and/or other geographic features of the map 113; indeed, the shape is generally based on the public-safety factors represented by the indications 403, 405. Similarly, the diameter and/or size of the first public-safety geofence 421 is generally based on the public-safety factors represented by the indications 403, 405. Hence, for example, an incident type of a car accident may cause the diameter of the first public-safety geofence 421 to be of a given size (e.g. 500 meters), however the diameter of the first public-safety geofence 421 may be modified and/or expanded (as depicted) to include the location 107-1 of the first responder unit 105-1.

Attention is next directed to FIG. 5 which is substantially similar to FIG. 4. However, in FIG. 5, a "YES" decision at the block 312 of the method 300 has occurred, and the block 314 and the block 316 of the method 300 has been implemented. In particular, in FIG. 5, the selectable modification function 415 has been moved to the disabled position (e.g. at the block 312 of the method 300) and the selectable modification functions 416 are commensurately disabled; indeed, the selectable modification functions 416 may be locked in the disabled position until the selectable modification function 415 has been moved to the enabled position.

In response to receiving disabling input (e.g. the selectable modification function 415 has been moved to the disabled position) to disable the given public-safety factor represented by the respective indications 405 of the public-safety factors, the public-safety factors represented by the indications 405 are disabled (e.g. at the block 314 of the method 300).

As also depicted in FIG. 5, the first public-safety geofence 421 is replaced (e.g. at the block 316 of the method 300), at the display screen 234, at the given location 401, with a second public-safety geofence 522 shaped and sized according to enabled public-safety factors which exclude the given public-safety factors as disabled. Hence, for example, as the public-safety factors of the responding unit 105-1 represented by the indications 405 are disabled, the second public-safety geofence 522 is generated with a diameter that excludes the location 107-1 of the responding unit 105-1. Indeed, the second public-safety geofence 522 is generally shaped and sized to according to the enabled public-safety factors of the incident.

While in FIG. 5, only the public-safety factors represented by the indications 405 are disabled, in other examples, any of the public-safety factors represented by the indications 403, 405 may be disabled or enabled to cause a previous public-safety geofence to be replaced with a current public-safety geofence. For example, when the incident type is disabled, an initial diameter of a current public-safety geofence may be based on a generic diameter and/or the locations 401, 107-1. Indeed, disabling the public-safety factors represented by the indications 403, 405 may have different effects on the shape and/or size of a public-safety geofence. For example, a diameter of a public-safety geofence may be increase with a current time, as compared to the time of the incident; disabling the time of the incident disables the time as a factor when determining the shape and/or size of a public-safety geofence.

Furthermore, replacing the first public-safety geofence 421 with the second public-safety geofence 522 may occur upon disabling a public-safety factor and/or upon disabling a public-safety factor and another actuation of the actuatable input 402.

As also depicted in FIG. 5, the second public-safety geofence 522 further includes the location 107-2 of the second responding unit 105-2. In some examples, with attention directed to FIG. 6, the second responding unit 105-2 may be selected (e.g. via selection of the icon at the location 107-2) which may cause respective indications 605 of the public-safety factors associated with the second responding unit 105-2 to be rendered at the display screen 234, and enabled via associated selectable modification functions 615, 616 being enabled. As such, at least the public-safety factors associated with the second responding unit 105-2 have been retrieved from the database 102.

Furthermore, in FIG. 6, the second public-safety geofence 522 is replaced (e.g. at the block 316 of the method 300), at the display screen 234, at the given location 401, with a third public-safety geofence 623 shaped and sized according to enabled public-safety factors which exclude the given public-safety factors as disabled (e.g. the public-safety factors associated with the first responder unit 105-1 remain disabled in FIG. 6). As depicted, only a portion of the third public-safety geofence 623 is circular, with another portion of the third public-safety geofence 623 that is around the location 107-2 following streets of the map 113; in these examples the shape of the third public-safety geofence 623 may be based on the role (and/or type, for example "Medical") of the second responding unit 105-2.

While not depicted, any of the public-safety geofences 421, 522, 623 may be replaced with a further public-safety geofence when one or more fields of the indications 403, 405, 605 are modified. For example, when the priority is changed from "High" to "Medium", or another value, a public-safety geofence sized and shaped according to at least the changed priority may be generated to replace a public-safety geofence 421, 522, 623.

Indeed, by disabling, enabling, and/or modifying combinations of the public-safety factors a public-safety geofence may be generates to replace a previous public-safety geofence.

Hence, provided herein is a device, system and method for generating geofences based on public-safety factors. By further rendering the public-safety factors at a map which shows a determined public-safety geofence, a user sees which public-safety factors are used to determine the shape and/or size of the public-safety geofence; furthermore, the user may adjust the public-safety geofence by disabling, enabling and/or modifying the public-safety factors. For example, a user may disable public-safety factors associated with responder unit locations to generate a public-safety geofence that may be reduced in size and/or that is not affected by the responder unit locations.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A method comprising:
   responsive to receiving, at an input device, an input requesting formation of a public-safety geofence at a given location of a cartographic map rendered at a display screen:
      retrieving, via an electronic device, public-safety factors from at least one public-safety information database;
      rendering, at the display screen, at the given location of the cartographic map, a first public-safety geofence shaped and sized according to the public-safety factors;
      rendering, at the display screen, respective indications of the public-safety factors;
      rendering, at the display screen, with the respective indications of the public-safety factors, respective selectable modification functions;
   responsive to receiving, at the input device, disabling input to disable a given public-safety factor represented by the respective indications of the public-safety factors, the disabling input received in association with a given selectable modification to disable the given public-safety factor:
      disabling the given public-safety factor; and
      replacing, at the display screen, at the given location of the cartographic map, the first public-safety geofence with a second public-safety geofence shaped and sized according to enabled public-safety factors which exclude the given public-safety factor as disabled.

2. The method of claim 1, further comprising: responsive to receiving, at the input device, modifying input to modify a given enabled public-safety factor of the enabled public-safety factors:
   modifying the given enabled public-safety factor; and
   replacing, at the display screen, at the given location of the cartographic map, the second public-safety geofence with a third public-safety geofence shaped and sized according to the enabled public-safety factors which include the given public-safety factor as modified.

3. The method of claim 1, further comprising: responsive to receiving, at the input device, enabling input to enable the given public-safety factor:
   enabling the given public-safety factor; and
   replacing, at the display screen, at the given location of the cartographic map, the second public-safety geofence with a third public-safety geofence shaped and sized according to the enabled public-safety factors which include the given public-safety factor.

4. The method of claim 1, wherein the input requesting formation of the public-safety geofence does not indicate both a shape and a size of the public-safety geofence.

5. The method of claim 1, wherein the input requesting formation of the public-safety geofence does not indicate one of a shape and a size of the public-safety geofence.

6. The method of claim 1, wherein the public-safety factors includes a responding unit location, and the respective indications of the public-safety factors, rendered at the display screen, include a respective indication of the responding unit location, the responding unit location disabled by the disabling input, and the second public-safety geofence shaped and sized according to the enabled public-safety factors which excludes the responding unit location.

7. The method of claim 1, wherein the public-safety factors includes a responding unit role, and the respective indications of the public-safety factors, rendered at the display screen, include a respective indication of the responding unit role, the responding unit role disabled by the disabling input, and the second public-safety geofence shaped and sized according to the enabled public-safety factors which excludes the responding unit role.

8. The method of claim 1, wherein the public-safety factors includes an incident type, and the respective indications of the public-safety factors, rendered at the display screen, include a respective indication of the incident type, the incident type disabled by the disabling input, and the second public-safety geofence shaped and sized according to the enabled public-safety factors which excludes the incident type.

9. The method of claim 1, wherein the respective selectable modification functions are further used to one or more of enable and modify an associated public-safety factor via receipt of respective enabling input and respective modifying at the input device.

10. A device comprising:
a controller in communication with an input device and a display screen, the controller configured to:
responsive to receiving, via the input device, an input requesting formation of a public-safety geofence at a given location of a cartographic map rendered at the display screen:
retrieve public-safety factors from at least one public-safety information database;
render, at the display screen, at the given location of the cartographic map, a first public-safety geofence shaped and sized according to the public-safety factors;
render, at the display screen, respective indications of the public-safety factors;
render, at the display screen, with the respective indications of the public-safety factors, respective selectable modification functions
responsive to receiving, via the input device, disabling input to disable a given public-safety factor represented by the respective indications of the public-safety factors, the disabling input received in association with a given selectable modification to disable the given public-safety factor:
disable the given public-safety factor; and
replace, at the display screen, at the given location of the cartographic map, the first public-safety geofence with a second public-safety geofence shaped and sized according to enabled public-safety factors which exclude the given public-safety factor as disabled.

11. The device of claim 10, wherein the controller is further configured to: responsive to receiving, via the input device, modifying input to modify a given enabled public-safety factor of the enabled public-safety factors:
modify the given enabled public-safety factor; and
replace, at the display screen, at the given location of the cartographic map, the second public-safety geofence with a third public-safety geofence shaped and sized according to the enabled public-safety factors which include the given public-safety factor as modified.

12. The device of claim 10, wherein the controller is further configured to: responsive to receiving, via the input device, enabling input to enable the given public-safety factor:
enable the given public-safety factor; and
replace, at the display screen, at the given location of the cartographic map, the second public-safety geofence with a third public-safety geofence shaped and sized according to the enabled public-safety factors which include the given public-safety factor.

13. The device of claim 10, wherein the input requesting formation of the public-safety geofence does not indicate both a shape and a size of the public-safety geofence.

14. The device of claim 10, wherein the input requesting formation of the public-safety geofence does not indicate one of a shape and a size of the public-safety geofence.

15. The device of claim 10, wherein the public-safety factors includes a responding unit location, and the respective indications of the public-safety factors, rendered at the display screen, include a respective indication of the responding unit location, the responding unit location disabled by the disabling input, and the second public-safety geofence shaped and sized according to the enabled public-safety factors which excludes the responding unit location.

16. The device of claim 10, wherein the public-safety factors includes a responding unit role, and the respective indications of the public-safety factors, rendered at the display screen, include a respective indication of the responding unit role, the responding unit role disabled by the disabling input, and the second public-safety geofence shaped and sized according to the enabled public-safety factors which excludes the responding unit role.

17. The device of claim 10, wherein the public-safety factors includes an incident type, and the respective indications of the public-safety factors, rendered at the display screen, include a respective indication of the incident type, the incident type disabled by the disabling input, and the second public-safety geofence shaped and sized according to the enabled public-safety factors which excludes the incident type.

18. The device of claim 10, wherein the respective selectable modification functions are further used to one or more of enable and modify an associated public-safety factor via receipt of respective enabling input and respective modifying via the input device.

* * * * *